(12) United States Patent
Mochizuki et al.

(10) Patent No.: US 11,934,071 B2
(45) Date of Patent: Mar. 19, 2024

(54) ELECTRONIC DEVICE

(71) Applicant: JAPAN DISPLAY INC., Tokyo (JP)

(72) Inventors: Kazuhide Mochizuki, Tokyo (JP); Yoshiro Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/229,429

(22) Filed: Aug. 2, 2023

(65) Prior Publication Data

US 2023/0418116 A1 Dec. 28, 2023

Related U.S. Application Data

(63) Continuation of application No. PCT/JP2022/001179, filed on Jan. 14, 2022.

(30) Foreign Application Priority Data

Feb. 4, 2021 (JP) .................................. 2021-016568

(51) Int. Cl.
*G02F 1/1343* (2006.01)
(52) U.S. Cl.
CPC .. *G02F 1/134327* (2013.01); *G02F 2201/122* (2013.01)

(58) Field of Classification Search
None
See application file for complete search history.

(56) References Cited

U.S. PATENT DOCUMENTS 11,815,774 B2 * 11/2023 Nishiyama .......... H04M 1/0264
2021/0141266 A1 5/2021 Takimoto et al.

FOREIGN PATENT DOCUMENTS

JP 2020-013068 A 1/2020

* cited by examiner

*Primary Examiner* — Richard H Kim
(74) *Attorney, Agent, or Firm* — K&L Gates LLP

(57) ABSTRACT

According to one embodiment, an electronic device includes a display panel and an image sensor element, the display panel includes a first area that does not overlap the image sensor element and a second area that overlaps the image sensor element, the display panel includes a first electrode, a second electrode that overlaps the first electrode, and a liquid crystal layer, the second electrode includes a plurality of first slits provided in the first area and a plurality of second slits provided in the second area, the second electrode includes a plurality of first slits provided in the first area and a plurality of second slits provided in the second area, the plurality of second slits are arranged based on a Fibonacci sequence.

5 Claims, 10 Drawing Sheets

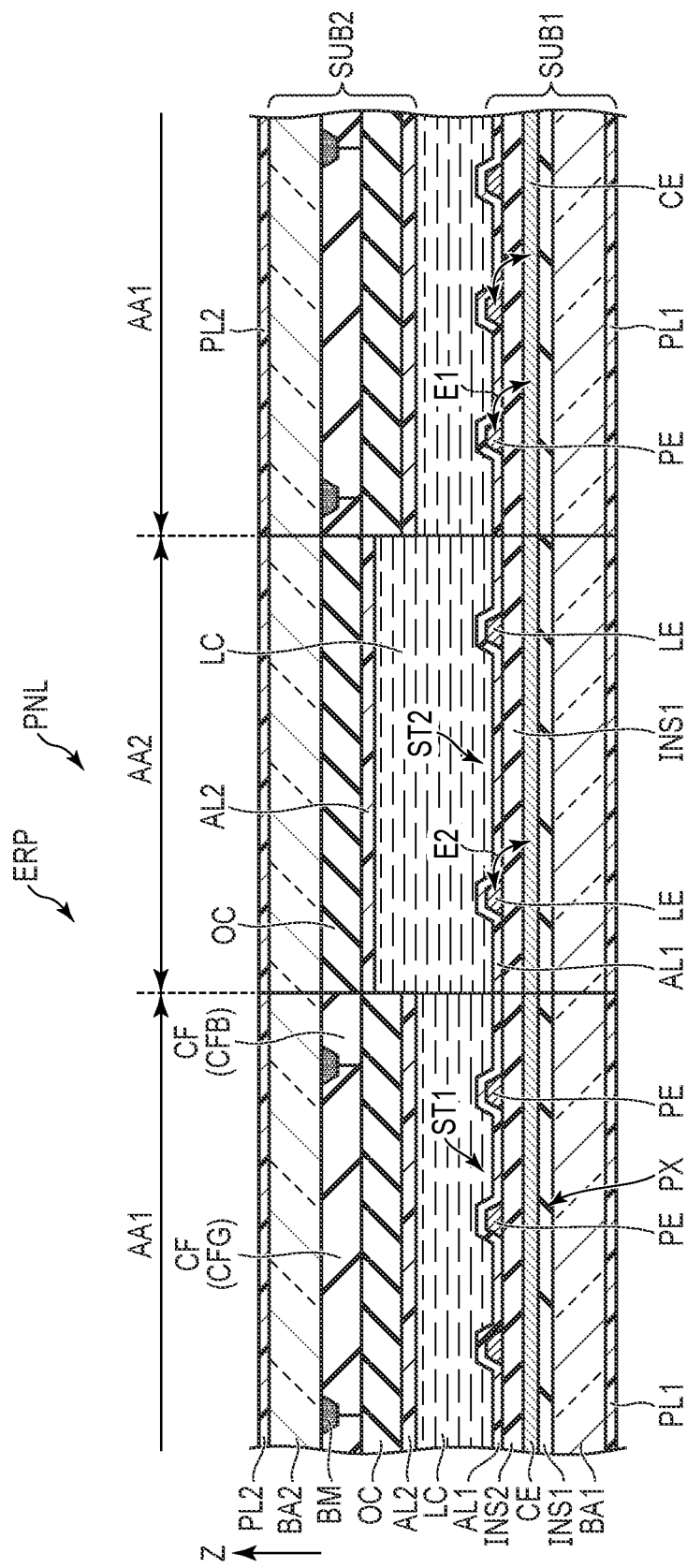
F I G. 4

ELECTRONIC DEVICE

CROSS-REFERENCE TO RELATED APPLICATIONS

This application is a Continuation Application of PCT Application No. PCT/JP2022/001179, filed Jan. 14, 2022 and based upon and claiming the benefit of priority from Japanese Patent Application No. 2021-016568 filed Feb. 4, 2021, the entire contents of all of which are incorporated herein by reference.

FIELD

Embodiments described herein relate generally to an electronic device.

BACKGROUND

In recent years, electronic devices comprises a display area and an image pickup element (image sensor element) on the same surface side have been widely put to practical use.

BRIEF DESCRIPTION OF THE DRAWINGS

FIG. 4 is a cross-sectional view showing the display panel.

DETAILED DESCRIPTION

Figure 1:
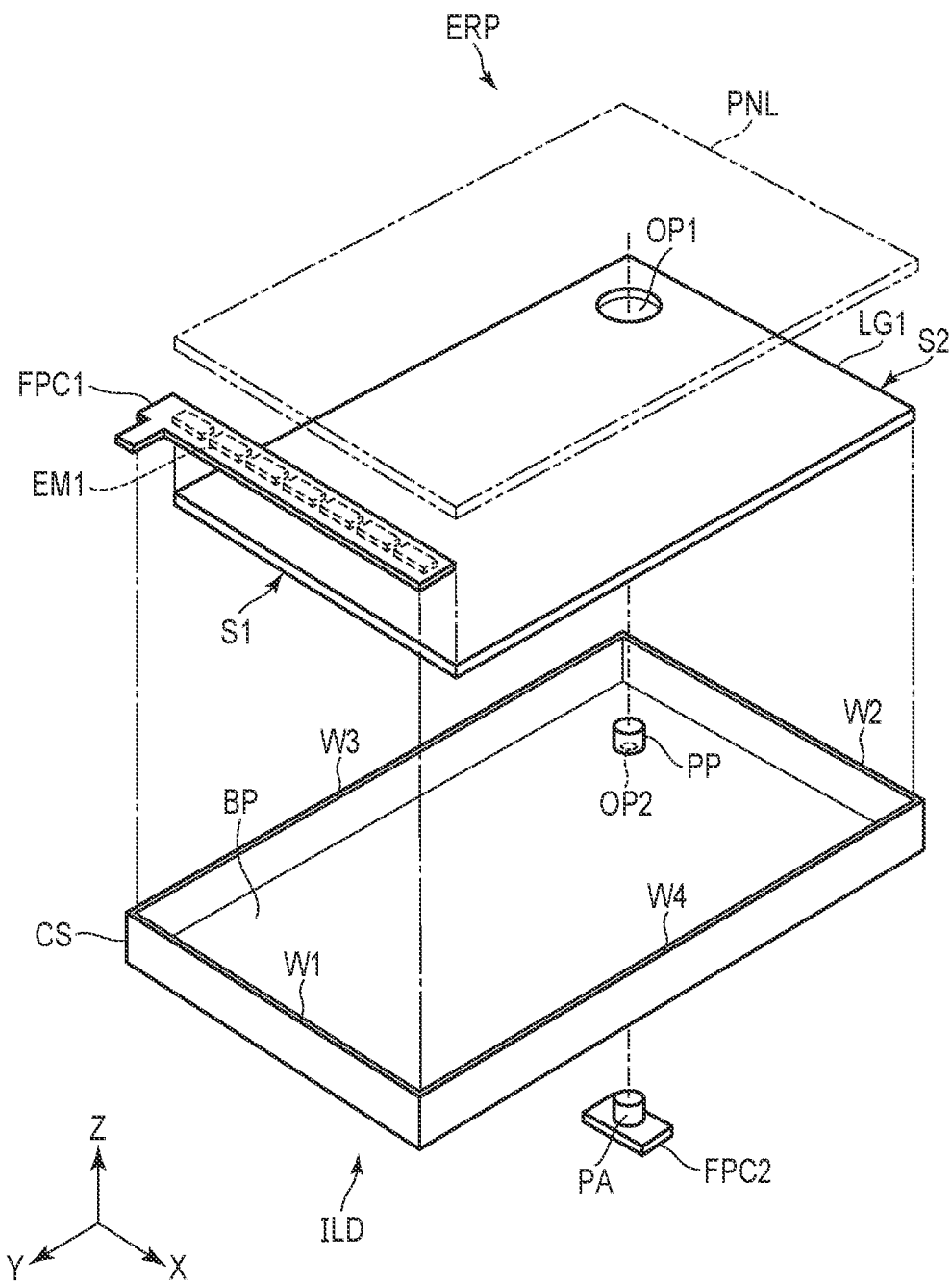
FIG. 1 is an exploded schematic view showing an electronic device of an embodiment.

In general, according to one embodiment, an electronic device comprises
a display panel; and
an image sensor element, wherein
the display panel includes a first area that does not overlap the image sensor element and a second area that overlaps the image sensor element,
the display panel including a first electrode, a second electrode that overlaps the first electrode, and a liquid crystal layer,
the second electrode incudes a plurality of first slits provided in the first area and a plurality of second slits provided in the second area, and
the plurality of second slits are arranged based on a Fibonacci sequence.

An object of the present embodiment is to provide an electronic device which can suppress blurring of images due to reflection and diffraction of light during image capture.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of an electronic device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the electronic device on a tip side of the arrow in the third direction Z. Here, viewing from this observation position toward the X-Y plane defined by the first direction X and the second direction Y is referred to as plan view. Viewing a cross-section of the electronic device in the X-Z plane defined by the first direction X and the third direction Z or in the Y-Z plane defined by the second direction Y and the third direction Z is referred to as cross-sectional view.

Embodiment

FIG. 1 is an exploded view showing an electronic device of an embodiment. An electronic device ERP shown in FIG. 1 includes an illumination device ILD, a display panel PNL and an image pickup element (image sensor element) PA. The display panel PNL is a liquid crystal display panel and includes a liquid crystal element LCD, the details of which will be described later.

The illumination device ILD comprises a light guide LG1, a light source EM1 and a housing CS. The illumination device ILD, for example, illuminates the display panel PNL, which is shown in FIG. 1 in simplified form with dashed lines.

The light guide LG1 is formed into a flat plate parallel to the X-Y plane defined by the first direction X and the second direction Y. The light guide LG1 opposes the display panel PNL. The light guide LG1 includes a side surface S1, a side surface S2 on an opposite side to the side surface S1 and an opening OP1. The side surface S1 and the side surface S2 each extend along the first direction X. For example, the side surface S1 and the side surface S2 are parallel to the X-Z plane defined by the first direction X and the third direction Z. The opening OP1 is a through-hole penetrating the light guide LG1 along the third direction Z. The opening OP1 is located between the side surface S1 and the side surface S2 along the second direction Y and is closer to the side surface S2 as compared to the side surface S1.

A plurality of light sources EM1 are arranged to be spaced apart from each other along the first direction X. Each of the light sources EM1 is mounted on a wiring board FPC1 and electrically connected to the wiring board FPC1.

The housing CS accommodates the light guide LG1 and the light source EM1. The housing CS includes sidewalls W1 to W4, a bottom plate BP, an opening OP2 and a protrusion PP. The sidewall W1 and the sidewall W2 extend along the first direction X and oppose each other. The sidewall W3 and the sidewall W4 extend along the second direction Y and oppose each other. The opening OP2 is a through hole penetrating the bottom plate BP along the third direction Z. The opening OP2 overlaps the opening OP1 along the third direction Z. The protrusion PP is provided to protrude from the bottom plate BP along the third direction Z toward the display panel PNL and surround the opening OP2.

The image pickup element PA of the electronic device ERP shown in FIG. 1 is provided so as to overlap the opening OP2 along the third direction Z. The image pickup element PA is mounted on the wiring board FPC2 and electrically connected to the wiring board FPC2. The image pickup element PA passes through the opening OP2, inside the protrusion PP, and the opening OP1, and opposes the display panel PNL.

The display panel PNL overlaps the light guide LG1 and further overlaps the wiring board FPC2 and the image pickup element PA in the opening OP1.

Figure 2A:
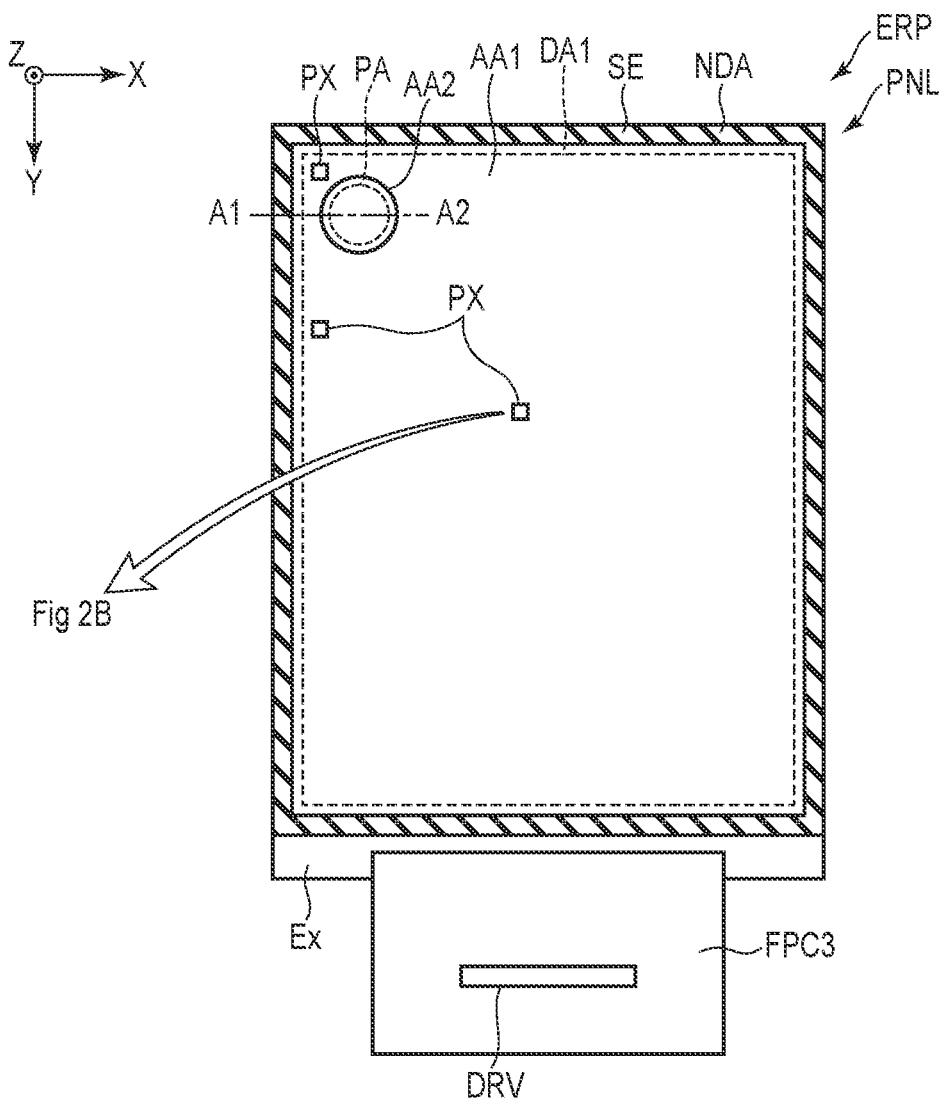
FIG. 2A is a diagram showing a display panel.
Figure 2B:
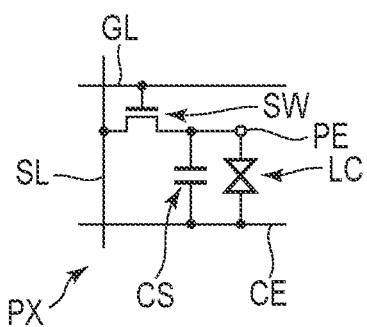
FIG. 2B is a diagram showing the display panel.

FIGS. 2A and 2B are diagrams showing the display panel. FIG. 2A is a plan view of the display panel PNL. FIG. 2B is a circuit diagram of a pixel PX. As shown in FIG. 2A, the display area DA is an area substantially rectangular that does not include a notch, but may have four rounded corners, or may be polygonal other than rectangular or circular. The display area DA is located on an inner side surrounded by the seal SE.

The display panel PNL comprises a plurality of pixels PX arranged in a matrix along the first direction X and the second direction Y in the display area DA. The pixels PX in the display area DA have an identical circuit configuration.

As shown in FIG. 2B, each of the pixel PX comprises a switching element SW, a pixel electrode PE, a common electrode CE, a liquid crystal layer LC and the like. The switching element SW is constituted by a thin-film transistor (TFT), for example, and is electrically connected to a respective scanning line GL and a respective signal line SL. To the scanning line GL, a control signal is supplied to control the switching element SW. To the signal line SL, a video signal is supplied as a signal different from the control signal. The pixel electrode PE is electrically connected to the switching element SW. The liquid crystal layer LC is driven by an electric field generated between the pixel electrode PE and the common electrode CE. A capacitance Cs is formed, for example, between an electrode of the same potential as that of the common electrode CE and an electrode of the same potential as that of the pixel electrode PE.

The wiring board FPC3 is mounted on and electrically connected to the extended portion Ex of the first substrate SUB1. The drive element DRV is mounted on the wiring board FPC3 and electrically connected to the wiring board FPC3. Note that the drive element DRV may be mounted on the extended portion Ex and electrically connected to the extended portion Ex. The drive element DRV contains, for example, a display driver built therein, that outputs signals necessary for image display. The wiring board FPC4 is a flexible printed circuit board that can be bent.

The display area DA includes areas that do not overlap the image pickup element PA (areas AA1) and areas that overlap the image pickup element PA (area AA2). The pixel PX disposed in the respective area AA1 comprise a color filter CF. Each pixel PX can display red, green, or blue color. Note when the pixel PX is a white pixel, the pixel PX can display white (or transparent), gray or black.

Figure 3:
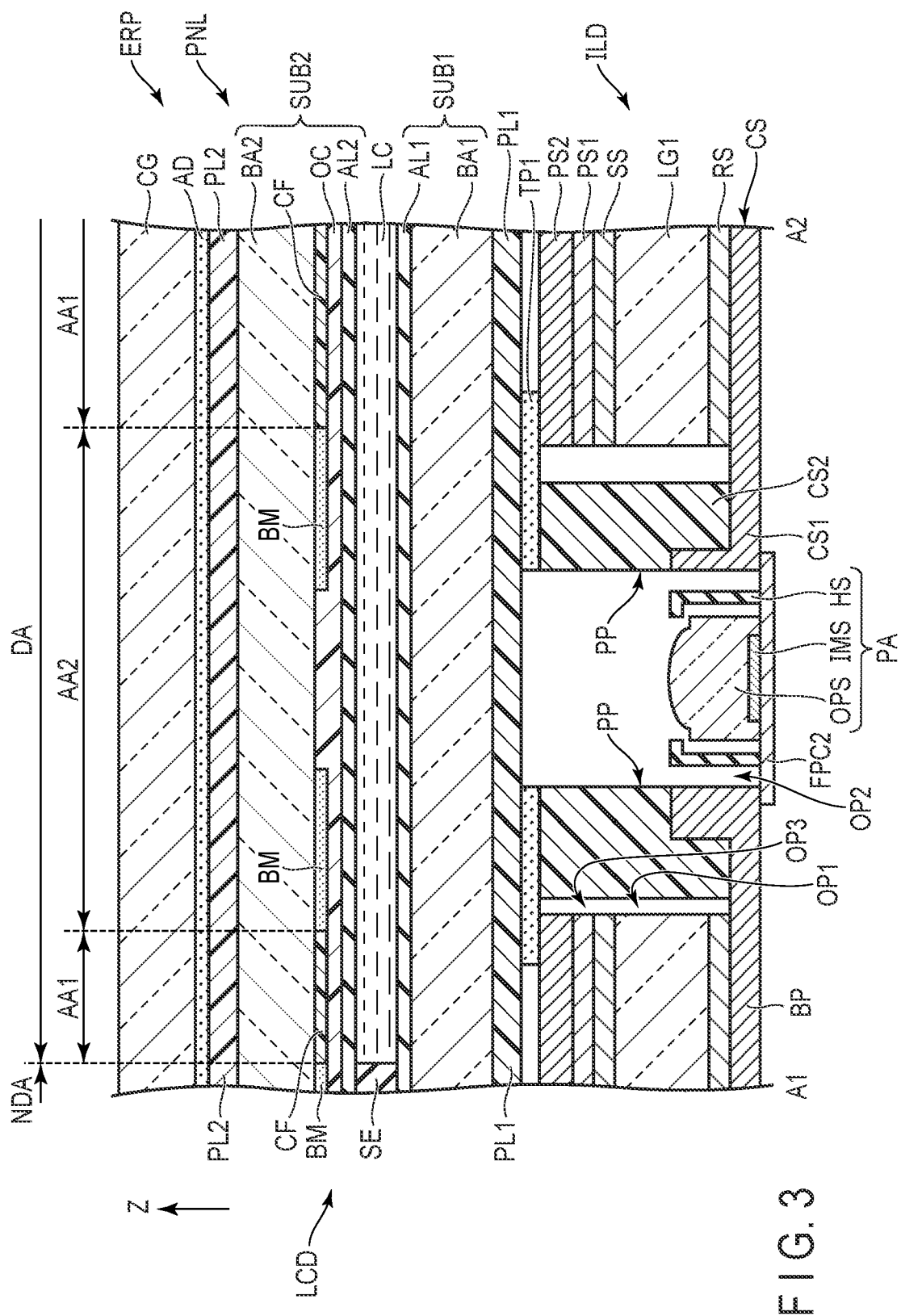
FIG. 3 is a cross-sectional view showing the electronic device taken along line A1-A2 in FIG. 2.

FIG. 3 is a cross-sectional view of the electronic device taken along line A1-A2 in FIG. 2A. FIG. 3 is a cross-section of the electronic device ERP taken along the second direction Y, which includes the display panel PNL, the image pickup element PA and the illumination device ILD.

As shown in FIG. 3, the illumination device ILD further comprise a reflective sheet RS, a diffusion sheet SS, a prism sheet PS1, a prism sheet PS2, a wavelength conversion element and an adhesive tape TP1.

The reflective sheet RS, the light guide LG1, the diffusion sheet SS, the prism sheet PS1 and the prism sheet PS2 are arranged in this order along the third direction Z and are accommodated in the housing CS. The housing CS comprises a metal-made housing CS1 and a resin-made pedestal CS2. The pedestal CS2 forms the protrusion PP together with the housing CS1. Each of the diffusion sheet SS, the prism sheet PS1 and the prism sheet PS2 includes an opening OP3 that overlaps the opening OP1. The protrusion PP of the housing CS is located inside the opening OP1 and the opening OP3.

A polarizer PL1, the display panel PNL, a polarizer PL2 and a cover member CG are arranged in this order along the third direction Z to constitute a liquid crystal device LCD having an optical switch function for light traveling along the third direction Z.

In more detail, the polarizer PL1 is provided in contact with a base BA1 of the first substrate SUB1. The polarizer PL2 is provided in contact with a base BA2 of the second substrate SUB2. Between the polarizer and the base (substrate), an adhesive or adhesive tape, not shown, is provided so as to adhere the polarizer to the base.

The material of the cover member CG is, for example, glass.

The adhesive tape TP1 is, for example, a transparent or white double-sided adhesive tape, which adheres the illumination device ILD and the liquid crystal element LCD together. In this embodiment, the adhesive tape TP1 adheres the polarizer PL1 and the prism sheet PS2 together.

The display panel PNL comprises a display area DA for displaying images and a non-display area NDA surrounding the display area DA. The display panel PNL comprises a first substrate SUB1, a second substrate SUB2, a liquid crystal layer LC and a seal SE. The seal SE is located in the non-display area NDA and adheres the first substrate SUB1 and the second substrate SUB2 together and seals the liquid crystal layer LC. In other words, the display area DA is the area that is occupied by the first substrate SUB1, the second substrate SUB2 and the liquid crystal layer LC sandwiched between the first substrate SUB1 and the second substrate SUB2, but does not overlap the seal SE.

Now, the main parts of the first substrate SUB1 and the second substrate SUB2 will be described. The first substrate SUB1 comprises a base BA1 and an alignment film AL1. The second substrate SUB2 comprises a base BA2, a color filter CF, a light-shielding layer BM, a transparent layer OC, and an alignment film AL2.

The base BA1 and the base BA2 are transparent substrates such as of glass and flexible resin. The alignment film AL1 and the alignment film AL2 are in contact with the liquid crystal layer LC.

The color filter CF, the light-shielding layer BM and the transparent layer OC are located between the base BA2 and the liquid crystal layer LC. Note that in the example shown in FIG. 3, the color filter CF is provided on the second substrate SUB2, but may as well be provided on the first substrate SUB1.

The light-shielding layer BM is located in the non-display area NDA. A boundary LB between the display area DA and the non-display area NDA is defined, for example, by an inner edge of the light-shielding layer BM (the edge on a display area DA side). The seal SE is provided at a location overlapping the light-shielding layer BM.

Details of the color filter CF are omitted here, but the color filter CF includes, for example, a red color filter disposed on a red pixel, a green color filter disposed on a green pixel, and a blue color filter disposed on a blue pixel. Further, the color filter CF may include a transparent resin layer that is placed on a white pixel. The transparent layer OC covers the color filter CF and the light-shielding layer BM. The transparent layer OC is, for example, a transparent organic insulating layer. The transparent layer OC is disposed over the area AA1 and the area AA2, and is in contact with the color filter CF in the area AA1 and in contact with the base BA2 in the area AA2. The alignment film AL1 and the alignment film AL2 are provided over the area AA1 and the area AA2.

In this embodiment, the image pickup element PA is, for example a camera. The image pickup element PA may be, as an example, one that detects visible light, one that detects infrared light, a proximity sensor that senses the proximity of an object to be detected, a detection element that detects infrared light reflected from an object to be detected, or a combination of any of these. The electronic device ERP may comprise a light emitting element in place of or in addition to the image pickup element PA. An example of the light emitting element may be a projection element that projects infrared light toward an object to be detected.

The image pickup element PA is provided to overlap the opening OP2 of the housing CS and is located in an inner side surrounded by the protrusion PP. A part or entirety of the image pickup element PA overlaps the display area DA of the display panel PNL along the third direction Z. In an electronic device ERP including a display panel PNL and an image pickup element PA, the image pickup element PA should only be provided in a rear side of the display panel PNL as viewed from a user of the electronic device ERP.

The image pickup element PA comprises, for example, an optical system OPS including at least one lens, a sensor element IMS and a housing HS. The sensor element IMS is an image pickup element capable of detecting images. The housing HS accommodates the optical system OPS and the sensor element IMS. The optical system OPS is located between the display panel PNL and the sensor element IMS.

FIG. 4 is a cross-sectional view of the display panel. In the display panel PNL, a plurality of pixels PX are provided in the area AA1. Each of the pixels PX include pixel electrodes PE, a common electrode CE and a liquid crystal layer LC. The pixel electrodes PE form an electrode of a comb-like shape (which may as well be referred to as a linear electrode), and slits ST1 are placed between the comb-shaped electrodes, respectively. An electric field is generated in a space E1 between the common electrode CE and the respective pixel electrode PE through the respective slit ST1. The electric field in the space E1 between the common electrode CE and the pixel electrode PE drives the liquid crystal layer LC.

The area AA2 functions as an optical aperture of the image pickup element PA. In the area AA2, electrodes LE, the common electrode CE and the liquid crystal layer LC are provided. A plurality of slits ST2 are provided between the electrodes LE, respectively. An electric field is generated between the common electrode CE and the respective electrode LE via the respective slit ST2. The electric field in the space E2 between the common electrode CE and the respective electrode LE drives the liquid crystal layer LC. The electric field of the space E1 between the common electrode CE and the pixel electrode PE and the electric field of the space E2 between the common electrode CE and the electrode LE are so-called lateral electric fields.

The detailed cross-sectional configuration of the display panel PNL will now be described below. Note that in the display panel PNL shown in FIG. 4, the illumination device ILD is omitted from the illustration.

The first substrate SUB1 comprises an insulating layer INS1, an insulating layer INS2, a common electrode CE, pixel electrodes PE and electrode LE between the base BA1 and the alignment film AL1. Note that the scanning lines GL, the signal lines SL and the switching elements SW shown in FIG. 2, for example, are located between the base BA1 and the common electrode CE. The common electrode CE is located above the insulating layer INS1 and covered by the insulating layer INS2.

The pixel electrodes PE and the electrode LE are located above the insulating layer INS2 and covered by the alignment film AL1. Each of the pixel electrodes PE opposes the common electrode CE via the insulating layer INS2. The electrode LE oppose the common electrode CE via the insulating layer INS2.

The common electrode CE, the pixel electrodes PE and the electrode LE are formed of a transparent conductive material such as indium tin oxide (ITO) or indium zinc oxide (IZO). The pixel electrodes PE form, for example, an electrode of a line-like or comb-like shape, and the common electrode CE is a flat plate electrode provided in common over a plurality of pixels PX, for example. Note that, as a configuration, the pixel electrodes PE may be formed into a flat plate shape, and a line-shaped common electrode CE may be provided between the pixel electrode PE and the liquid crystal layer LC. The insulating layer INS1 includes an inorganic insulating layer and an organic insulating layer, which will not be described in detail. The details of the shape of the electrode LE will be described later. The insulating layer INS2 is, for example, an inorganic insulating layer such as of silicon nitride.

In the second substrate SUB2, the light-shielding layer BM is formed to be integrated with the light-shielding layer BM in the non-display area NDA shown in FIG. 3. The color filter CF includes a red color filter CFR, a green color filter CFG and a blue color filter CFB. The green color filter CFG opposes the pixel electrode PE. The red color filter CFR and the blue color filter CFB as well oppose other pixel electrodes PE, respectively, which are not shown in the figure.

The display panel PNL includes, for example, a scanning line drive circuit (not shown) electrically connected to the scanning lines GL and a driver (not shown) including a signal line drive circuit electrically connected to the signal lines SL. The driver outputs a signal necessary for image display to each of the pixels PX in the area AA1 of the display area DA to control the transmittance of the liquid crystal layer LC. The transmittance of the liquid crystal layer LC is controlled according to the magnitude of the voltage applied to the liquid crystal layer LC.

As shown in FIGS. 3 and 4, the electrode LE and the common electrode CE are provided to overlap the image pickup element PA. The electrode LE and the common electrode CE are transparent electrodes formed of a transparent conductive material as described above. In the electrode LE with multiple slits ST2, ghosting may undesirably occur due to optical interference. In particular, when the intervals between respective adjacent pairs of slits ST2 are equal to each other, ghosting occurs and becomes more pronounced.

On the other hand, if the intervals of the slits ST2, in other words, the intervals of electrode portions arranged while respectively interposing the slits ST2, are short, the driving voltage of the liquid crystal layer LC can be made smaller, which has the advantage of being easier to drive. There is a trade-off relationship between the generation of ghosts and the reduction of the drive voltage of the liquid crystal layer LC.

Therefore, in this embodiment, the plurality of slits ST2 are arranged in a Fibonacci array. In other words, the electrode portions arranged respectively across the slits ST2 are arranged in a Fibonacci array. With this arrangement, it is possible to lower the drive voltage of the liquid crystal layer LC while suppressing the generation of ghosting.

Figure 5:
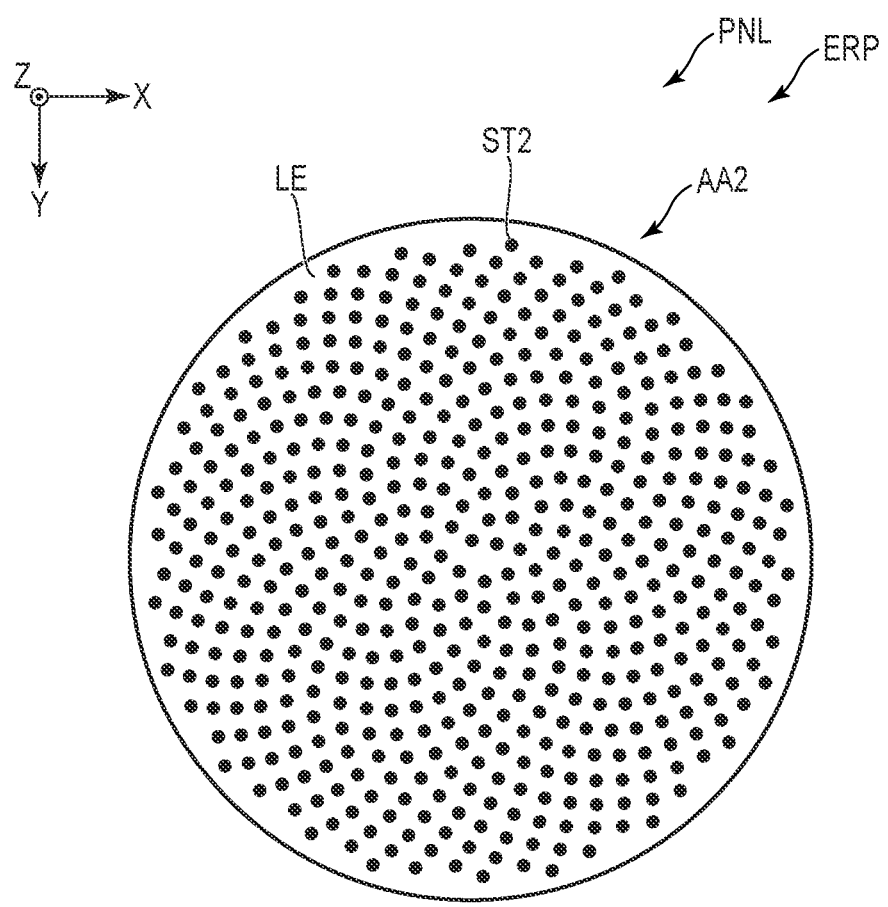
FIG. 5 is a plan view showing an electrode and slits.

FIG. 5 is a plan view showing an electrode LE and slits ST2. The slits ST2 are arranged based on the Fibonacci sequence, which is a non-periodic array as well as a quasi-periodic array. In this specification, such an array is referred to as a Fibonacci array. The Fibonacci array can be compared to the arrangement of sunflower seeds or the like, and is a spiral-shaped array as shown in FIG. 5.

The Fibonacci sequence is a numeral sequence expressed by $(x, y)=([a \times t \times \cos\{(\alpha/180)nt\}], [a \times t \times \sin\{(\alpha/180)nt\}])$ (Formula 1), where a represents an arbitrary constant, t represents a natural number, α represents a golden angle $(\alpha=\{360/(1+\varphi)\}=137.5°)$, and φ represents a golden ratio $(\varphi=\{(1+\sqrt{5})/2\}=1.6018)$.

The Fibonacci array has a matrix in which clockwise and counterclockwise helical arrangements are combined, which becomes more radial as the location approaches the outside. By arranging the slit ST2 in a Fibonacci array, they can be randomly arranged at a predetermined degree or more of randomness while keeping a certain of degree of regularity. With such random arrangement of the slits ST2, it is possible to suppress ghosting from occurring. On the other hand, with the array of the slits ST2 with a certain degree of regularity, the electrode LE can be driven with a voltage close to the driving voltage of the pixel electrodes PE. In other words, for driving the electrode LE, there is less need to apply an additional voltage in addition to the drive voltage of the pixel electrodes PE. Therefore, it is possible to suppress the increase in drive voltage while maintaining the transparency of the electrode LE.

Note that the size of the slits ST2 illustrated in FIG. 5 is only an example and is not limited to this. The slits ST2 can take any size as long as they are arranged based on Formula 1.

In FIG. 5, circular-shaped slits ST2 are shown, but the shape of the slits ST2 is not limited to this. For example, the shape can be, for example, a point symmetrical shape such as a regular hexagon, regular octagon, regular hexadecagon or the like, or a line symmetrical shape such as a rectangle.

Note that the electrodes LE are not limited to an integrally formed and continuous conductive film, the so-called solid film, but may be an electrode divided into multiple parts.

Figure 6:
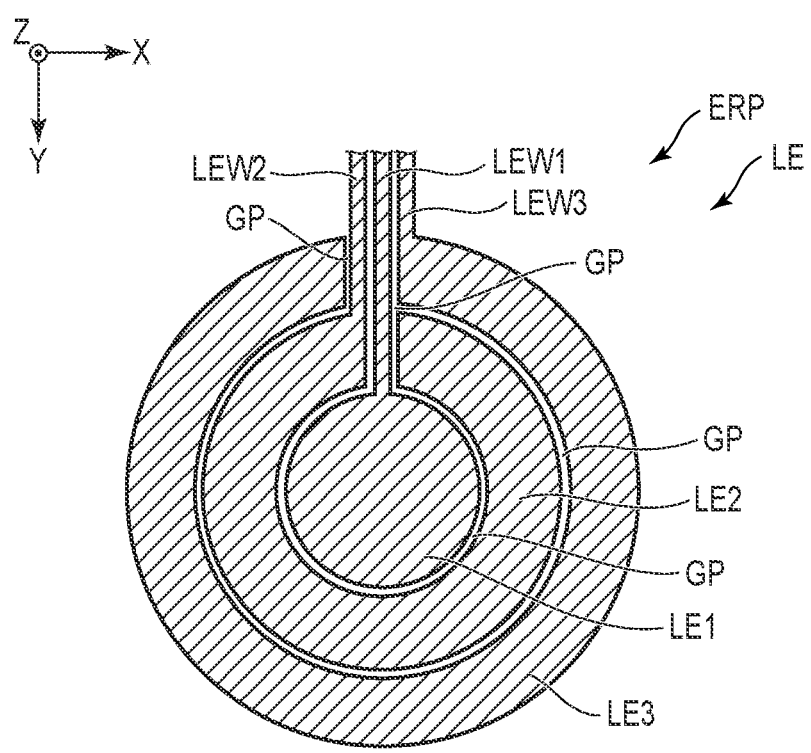
FIG. 6 is a plan view showing the electrode.

FIG. 6 is a plan view of the electrode LE. The electrode LE includes three electrodes LE1, LE2, and LE3 arranged in concentric circles. Although not shown so as to be able to easily view the drawing, the electrode LE1, the electrode LE2 and the electrode LE3 are each provided with a slit ST2.

The electrode LE1 is connected to a wiring line LEW1 formed to be integrated with the electrode LE1. The electrode LE2 is connected to a wiring line LEW2 formed to be integrated with the electrode LE2. The electrode LE3 is connected to a wiring line LEW3 formed to be integrated with the electrode LE3.

Gaps GP are provided between the electrode LE1 and the wiring line LEW1, between the electrode LE2 and the wiring line LEW2, and between the electrode LE3 and the wiring line LEW3, respectively. With the gaps GP, the electrode LE1, the electrode LE2, and the electrode LE3 are insulated from each other.

Via the wiring line LEW1, the wiring line LEW2 and the wiring line LE3, voltage is applied to the electrode LE1, the electrode LE2, and the electrode LE3 independently from outside. Here, by changing the alignment of the liquid crystal layer LC according to the electrode to which voltage is applied, an aperture function can be imparted to the area AA2.

Figure 7:
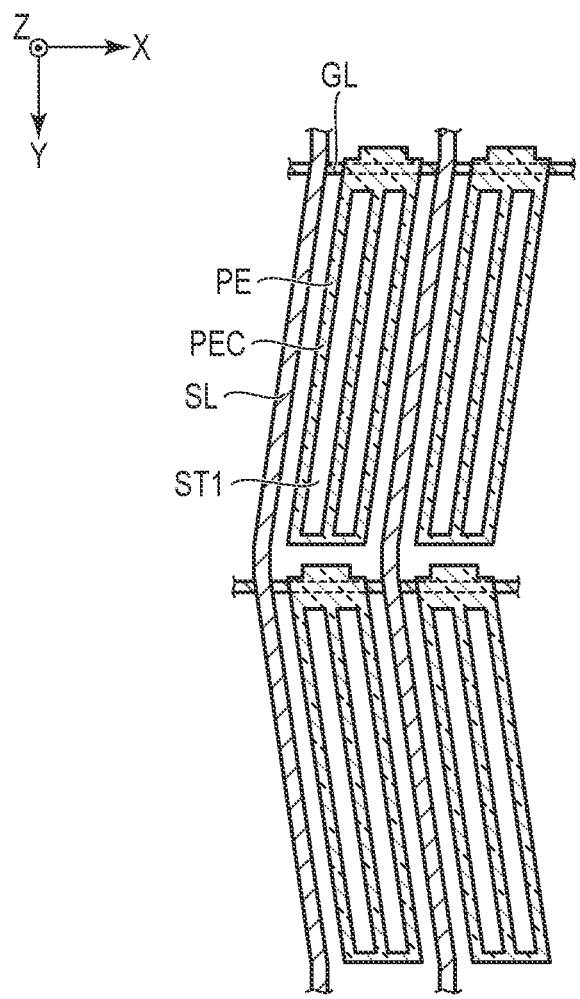
FIG. 7 is a plan view showing pixels.

FIG. 7 is a plan view of pixels. Note that in FIG. 7, only the configuration necessary for explanation is illustrated, and the switching element SW, common electrode CE, color filter CF and the like are omitted.

As shown in FIG. 7, the plurality of pixels PX have a configuration corresponding to the fringe field switching (FFS) mode, which is one of the display modes that utilizes a lateral electric field.

The plurality of scanning lines GL extend along the first direction X and are arranged along the second direction Y. The plurality of signal lines SL are arranged along the first direction X and extend along the second direction Y.

The pixel electrodes PE include slits ST1 extending along the signal lines SL, respectively. The electrode portions of the pixel electrodes PE arranged between the respective slits ST1 form a comb-shaped electrode PEC. In the example shown in FIG. 7, two slits ST1 and three comb-shaped electrodes PEC are arranged on one pixel electrode PE, but the configuration is not limited to this. The slits ST1 and the comb-shaped electrode PECs can be arranged in an appropriate number.

As illustrated in this embodiment, in the electrode LE arranged in the area AA2, the slits ST2 are arranged in a Fibonacci array, and thus the slits ST2 can be arranged at random in a certain degree or more while maintaining a certain regularity. Therefore, the area AA2 can be driven with the voltage that drives the pixels PX while maintaining the transparency of the electrode LE. With this configuration, it is possible to suppress the increase in drive voltage. Further, blurring of images due to reflection and diffraction of light during image pick-up can be suppressed.

Configuration Example 1

Figure 8A:
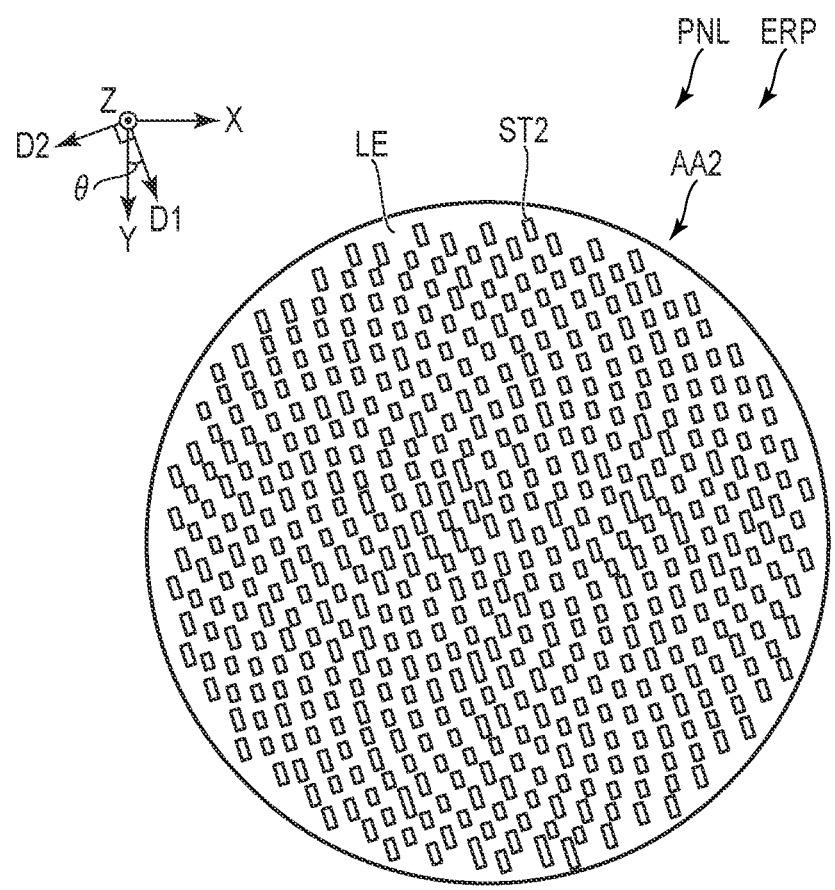
FIG. 8A is a plan view of another configuration example of the electronic device in the embodiment.
Figure 8B:
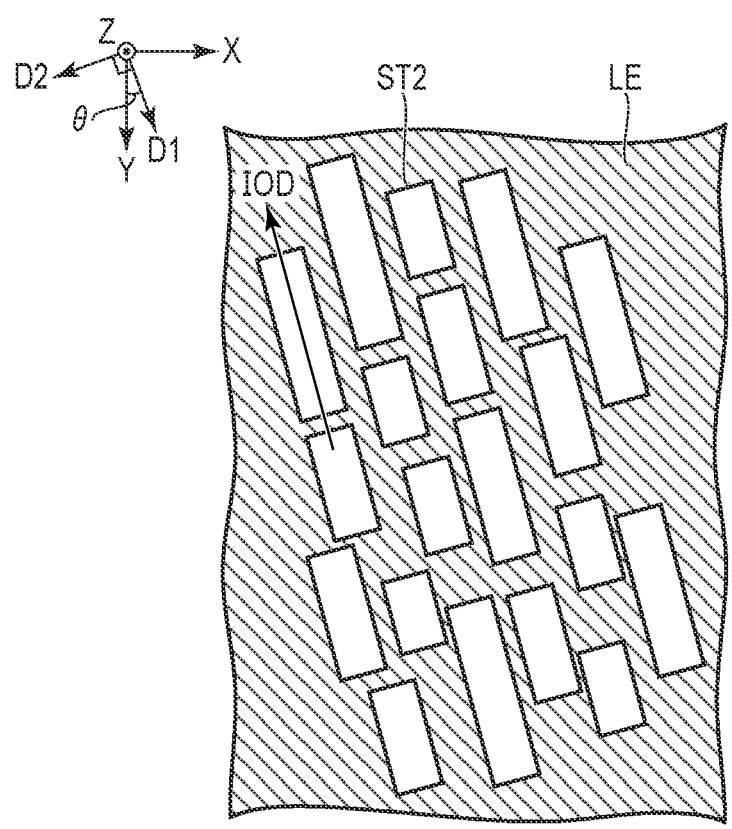
FIG. 8B is a plan view of still another configuration example of the electronic device in the embodiment.

FIGS. 8A and 8B each are a plan view showing another configuration example of the electronic device in the embodiment. The configuration example shown in FIGS. 8A and 8B differ from that of FIG. 5 in that the shape of the slits is rectangular.

FIG. 8A is a plan view of the area AA2 in the electronic device ERP. FIG. 8B is a partially enlarged view of FIG. 8A.

In FIG. 8, the direction intersecting at an acute angle θ clockwise with respect to the second direction Y is defined as a direction D1, and the direction orthogonal to the direction D1 is defined as a direction D2. The longitudinal direction of the slits ST2 is set along the direction D1, and the lateral direction is set along the direction D2.

An initial alignment direction IOD of the liquid crystal layer LC is parallel to direction D1. When voltage is applied to the liquid crystal layer LC, the alignment of the liquid crystal molecules in the liquid crystal layer LC changes. When the initial alignment direction IOD and the longitudinal direction of the slits ST2 are parallel to each other, the area where the alignment of the liquid crystal molecules can be changed becomes larger, thereby making it possible to increase the transmittance.

In FIG. 8, note that the length of the slits ST2 in the longitudinal direction should preferably be random. In other words, any pairs of slits ST2 adjacent to each other along the directions D1 and D2 should preferably have different lengths in the longitudinal direction. With this configuration, it is possible to further suppress the ghosting.

However, even if the lengths of the slits ST2 in the longitudinal direction are even, it is still possible to prevent an increase in drive voltage while suppressing the occurrence of ghosting as in the embodiment. Further, blurring of images due to reflection and diffraction of light during image pickup can be suppressed.

In this configuration example, advantageous effects similar to those the embodiment can be exhibited.

Configuration Example 2

Figure 9:
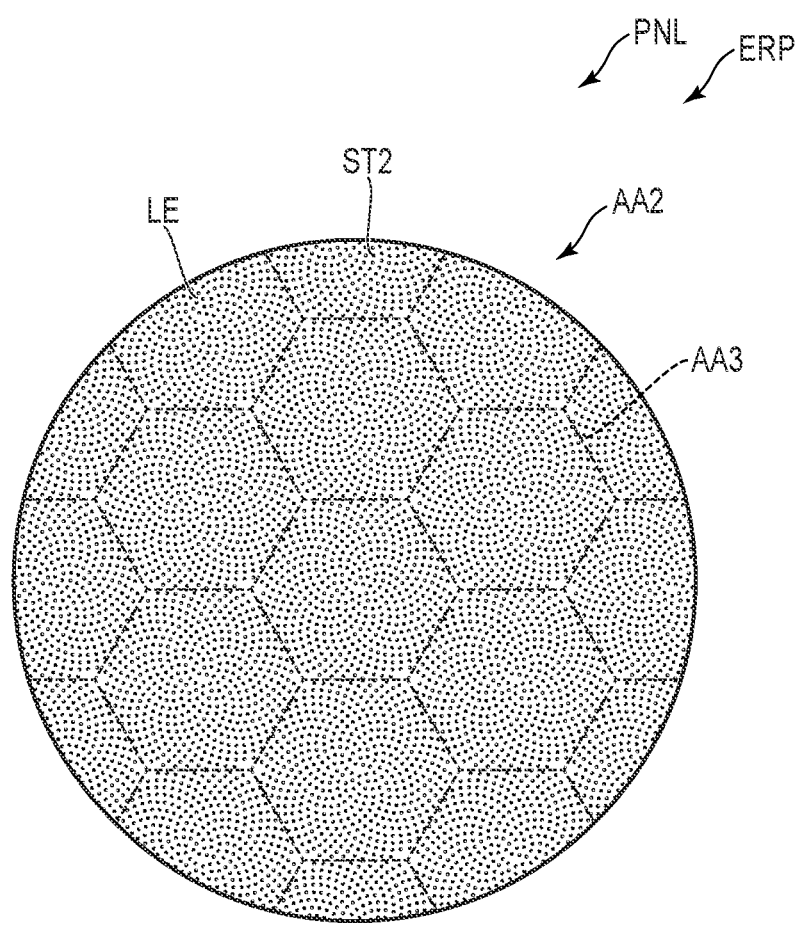
FIG. 9 is a plan view of still another configuration example of the electronic device in the embodiment.

FIG. 9 is a plan view of still another configuration example of the electronic device in the embodiment. The configuration example shown in FIG. 9 differs from that of FIG. 5 in that there are a plurality of areas where the slits ST2 arranged in the Fibonacci array can be provided.

FIG. 9 is a plan view of the area AA2 in the electronic device ERP. The area AA2 includes a plurality of areas AA3. Each of the areas AA3 is provided with slits ST2 arranged in the Fibonacci array.

In the Fibonacci arrangement, the slits are arranged more radially as the location approach the outside. In other words, the closer to the outside, the longer the distance between slits ST2 becomes. Therefore, there is a risk that the drive voltage of the outer side in the area AA2 may be higher than that of the inner side.

However, when multiple areas AA3 arranged in the Fibonacci array are disposed, the distance between slits ST2 does not become excessively long, because the slit ST2 arranged on an outer side of one area AA3 is close to the slit ST2 arranged on an outer side of another area AA3. With this configuration, the increase in drive voltage can be prevented.

In the example shown in FIG. 9, the shape of each of the areas AA3 is a regular hexagon. In other words, the plurality of areas AA3 constitute a honeycomb structure. With this structure, the slits ST2 can be arranged efficiently.

However, the shape of each of the areas AA3 is not limited to a regular hexagonal shape. Each of the areas AA3 may have some other shape such as a point symmetrical shapes, for example, a regular octagonal shape, a regular hexagonal shape or the like.

In this configuration example as well, similar effects to those of the embodiment can be exhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a display panel; and
    an image sensor element, wherein
    the display panel includes a first area that does not overlap the image sensor element and a second area that overlaps the image sensor element,
    the display panel including a first electrode, a second electrode that overlaps the first electrode, and a liquid crystal layer,
    the second electrode incudes a plurality of first slits provided in the first area and a plurality of second slits provided in the second area, and
    the plurality of second slits are arranged based on a Fibonacci sequence.
2. The electronic device according to claim 1, wherein the plurality of second slits each have a circular shape.
3. The electronic device according to claim 1, wherein the plurality of second slits each have a rectangular shape, and
    a longitudinal direction of the second slits is parallel to an initial alignment direction of the liquid crystal layer.
4. The electronic device according to claim 1, wherein the second area includes a plurality of third areas, and
    the plurality of third areas each include the plurality of second slits arranged based on the Fibonacci sequence.
5. The electronic device according to claim 4, wherein the plurality of third areas each have a regular hexagonal shape.

* * * * *